United States Patent [19]

Vezain et al.

[11] Patent Number: 4,489,329
[45] Date of Patent: Dec. 18, 1984

[54] SENSOR RELEASE LATCH FOR SPACE VEHICLE

[75] Inventors: Gérard Vezain; Jean-Claude Vermalle, both of Mandelieu, France

[73] Assignee: Societe Nationale Industrielle et Aerospatiale, Paris, France

[21] Appl. No.: 438,667

[22] Filed: Nov. 2, 1982

[30] Foreign Application Priority Data

Nov. 26, 1981 [FR] France ................. 81 22144

[51] Int. Cl.³ .............................................. H01Q 1/28
[52] U.S. Cl. .................... 343/705; 343/880; 343/DIG. 2; 24/506
[58] Field of Search ............... 24/506; 343/705, 708, 343/709, 710, 880, 881, 882, 892, DIG. 2

[56] References Cited

U.S. PATENT DOCUMENTS 3,803,614 4/1974 Reid ................. 343/705

Primary Examiner—Eli Lieberman
Attorney, Agent, or Firm—Karl W. Flocks; Sheridan Neimark

[57] ABSTRACT

A holding and releasing system provides temporary connection between a movable and a stationary part which are to be separated during the specific use thereof. It comprises a supporting foot connected to the fixed part, a rocker link hinged to said foot, a movable support hinged to said link, a sheaving bracket hinged to another end of said link; said link occupying two positions, i.e. a locking one in which the movable support bears on one face of the movable part, while the free end of the sheaving bracket bears on the other face of said movable part, to block the latter in a precise position, and a release position in which the movable support and said bracket are in a retracted position thereby releasing the movable part. The system is used especially in the space vehicle domain.

8 Claims, 12 Drawing Figures

SENSOR RELEASE LATCH FOR SPACE VEHICLE

This invention relates to a holding and releasing system to provide a temporary connection between two parts which are to be separated from one another during their specific use.

Thus, in the case of a space vehicle, a connection must temporarily provide for the positioning and stress transmission of the supported part in the various phases when the vehicle is being brought to its operative condition such as e.g. during the launching phase of the vehicle or the display phase of the appendices; the release itself must permit the supported part which has been released to oscillate with respect to the position in which it was held.

More particularly, it is known that the pointing requirements of the transmission or reception antennae of space vehicles prescribe such an antenna pointing device in certain vehicles which ensures fixity of the antenna coverage through such orientation thereof which results in the compensation for the attitude oscillations of the vehicle.

Still more particularly, the antenna pointing device which is the subject-matter of the applicant's U.S. Pat. No. 4,325,586 substantially comprises:

a section connected rigidly to the space vehicle;

a movable carrier section to which the antenna is rigidly secured;

a supple connection which in the operative condition secures both of the above parts through a stationary real or virtual point.

By rotation about two orthogonal axes the pointing device provides for the orientation of the movable section carrying the antenna so as to ensure the required coverage thereof.

However, the bringing into the operative configuration requires the relative temporary immobilization of both parts which cannot be achieved by the pointing device itself.

This invention relates to a holding and releasing system that can ensure:

immobilization of the movable part in a very precise position, since for reasons of reliability the position of the antenna in the launching configuration must permit it to be used in a degraded mode corresponding to the nominal position without correction of the attitude oscillations;

release of said movable part and the possibility for the latter to oscillate about the average position which is that of the launching immobilized position.

The system for temporary holding and release of a movable part in respect to a stationary part in accordance with the invention is characterized in that it comprises a certain number of elementary devices each being constituted by a supporting foot connected to the stationary part; a link in form of a rocker hinged at its central portion to said foot; a member in form of a movable support hinged to one end of the link; a sheaving bracket hinged to the other end of the link; the link being capable of being located either in a locking position in which the movable support comes to bear on a face of the movable part, while the free end of the sheaving bracket comes to bear on the other face of the movable part, opposite the movable support, thereby causing immobilization of the movable part in a very precise position, or a released position in which the movable support as well as the sheaving bracket are both in a retracted position thereby releasing the movable part from any holding stress and enabling it to oscillate; a release lever hinged to said foot to permit the rocker to be blocked to its locked position; a control system to free said release lever from its blocking function; and means for automatically causing the rocker to pivot from its locking position to its release position.

Other characteristics, advantages and specificities of this invention will appear from the following description in the light of the attached drawings which represent schematically and in a simple manner various possible exemplifying forms of embodiment of this invention.

It will first be recalled shortly that the invention relates to a device having a double role, of temporary immobilization and release of a movable carrier part in respect to a fixed part of the vehicle.

More specifically, the device according to the invention ensures:

the holding of a movable part in a determined position;

the constancy of positioning after several release trials;

the transmission of stresses of the supported part during the various phases when the satellite is brought to its operative position;

the release of the movable part which is allowed to oscillate about the average position corresponding to the launching position;

a high probability of achievement of its function.

Figure 1:
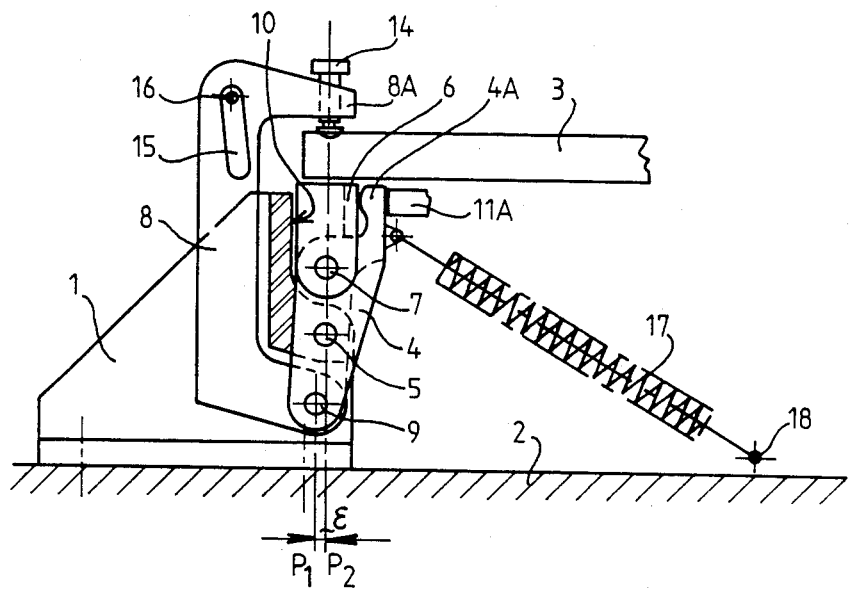
FIG. 1 is a detailed elevational view partly in cross-section showing a first possible form of embodiment of a holding device in accordance with the invention, said holding device being in the position of immobilization of the movable part.
Figure 2:
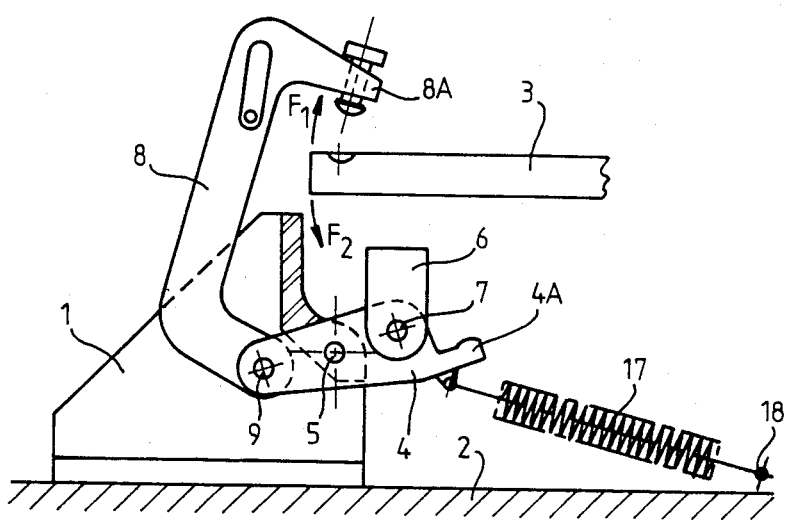
FIG. 2 is a view similar to FIG. 1, but said device is shown this time in the position of release of the movable element.
Figure 3:
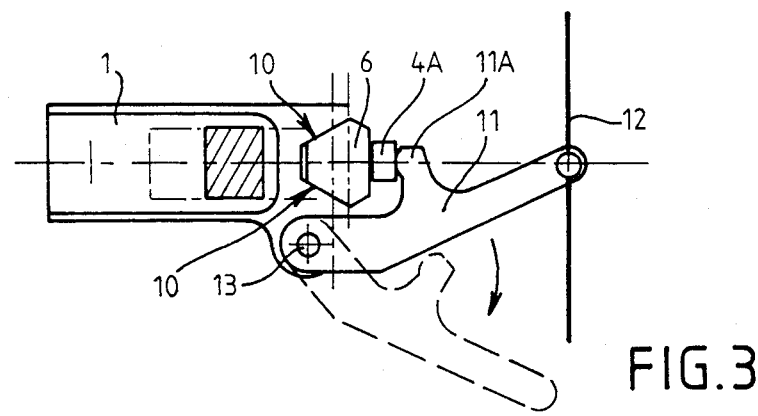
FIG. 3 is a top view partly in cross-section of the device showing the two possible positions of the control release lever.

Referring first to FIGS. 1, 2 and 3, it can be seen that the holding and releasing device according to the invention is substantially constituted by a foot 1 secured by any appropriate means to the suitable section 2 of the satellite so that the device can participate in the immobilization of a movable part 3 in a well determined position during the various phases to bring the satellite into its operative configuration; a link 4 hinged at its central portion to a transverse axis 5 of foot 1, such link being used as a rocker; a movable support 6 hinged to one end of the link 4 on a transverse axis 7; a C-shaped sheaving bracket 8 hinged at its lower (in the drawing) end to an axis 9 secured to the second end of link 4. Link 4 can take two possible positions which are respectively shown in FIG. 1, which is the sheaved or immobilization configuration of the movable part 3 in its average position corresponding to the missile launching phase, and in FIG. 2 which is the release configuration in which the movable part 3 is free to oscillate in the direction $F_1$ or the direction $F_2$ about the average position of launching of FIG. 1.

More specifically, the link 4 in the launching configuration is being maintained in a substantially vertical position (in the drawing) by means of a release lever 11, itself made stationary in such blocking position by a sheaving cable 12 (FIG. 3) which will be referred to with more detail hereinafter. To achieve such blocking of link 4, the release lever 11 which is hinged to a vertical axis 13 connected to the foot 1 is provided with a head $11_A$ which comes to rest on a shoulder $4_A$ of the link 4.

In such launching configuration, the movable support 6 hinged to the link 4 is being immobilized in the vertical position against the foot 1 in a V-shaped housing 10 comprised by the foot, through the link 4, itself blocked by the release lever 11. As clearly appears in FIG. 3, the movable support 6 has a complementary transverse cross-section in respect to that of the housing 10 of the foot 1.

Also, in the same launching configuration, the C-shaped sheaving bracket 8 provides the force for holding the movable part 3 on the movable support 6.

To this end the upper end $8_A$ of lever 8 comprises a tensioning screw 14 bearing on the upper face of the movable part 3. Such screw permits to produce the required tightening force. This tension can advantageously be monitored by using stress gauges stuck to the bracket and previously adjusted to the range of stresses to be applied.

According to another characteristic of the invention, which appears distinctly in FIG. 1, the geometric centerline of axis 9 to which the foot of the bracket 8 is hinged is contained in a plane $P_1$ shifted by an interval $\epsilon$ from the vertical plane $P_2$ in which the geometric centerlines of the hinging axis 5 of link 4 and the hinging axis 7 of the movable support 6 are contained.

It results from this characteristic that after the cutting of the sheaving cable 12 which will be explained hereinafter in detail and which results in the release lever 11 being brought from the sheaving position shown in uninterrupted lines in FIG. 3 to that of release shown in interrupted lines in the same figure, the unlocking torque generated by the tightening force exerted by the bracket 8 upon the movable part 3 (through the tensioning screw 14) with the lever arm corresponding to the shift of axis 9 with respect to axis 5, causes rotation of link 4 in the clockwise direction about its axis 5. Such rotation of link 4 consequently provokes the double retraction of the movable support 6 downwardly and the bracket 8 upwardly, thereby releasing the movable part 3.

During such pivoting of the link 4, the bracket 8 is held on a forced trajectory by a slot 15 formed therein, sliding against a fixed guiding organ 16.

In the form of embodiment shown in FIGs. 1 to 3, the movable support 6 is freely hinged to the link 4 about the axis 7 but obviously, if required by a functional necessity it can be provided with guiding means identical to that of the bracket.

Moreover, a return spring 17 secured between the link 4 and a fixed point 18 provides for complete retraction as well as the immobilization of both link 4 and the bracket 8 to secure them in the relative positions of the release configuration in FIG. 2.

Figure 4:
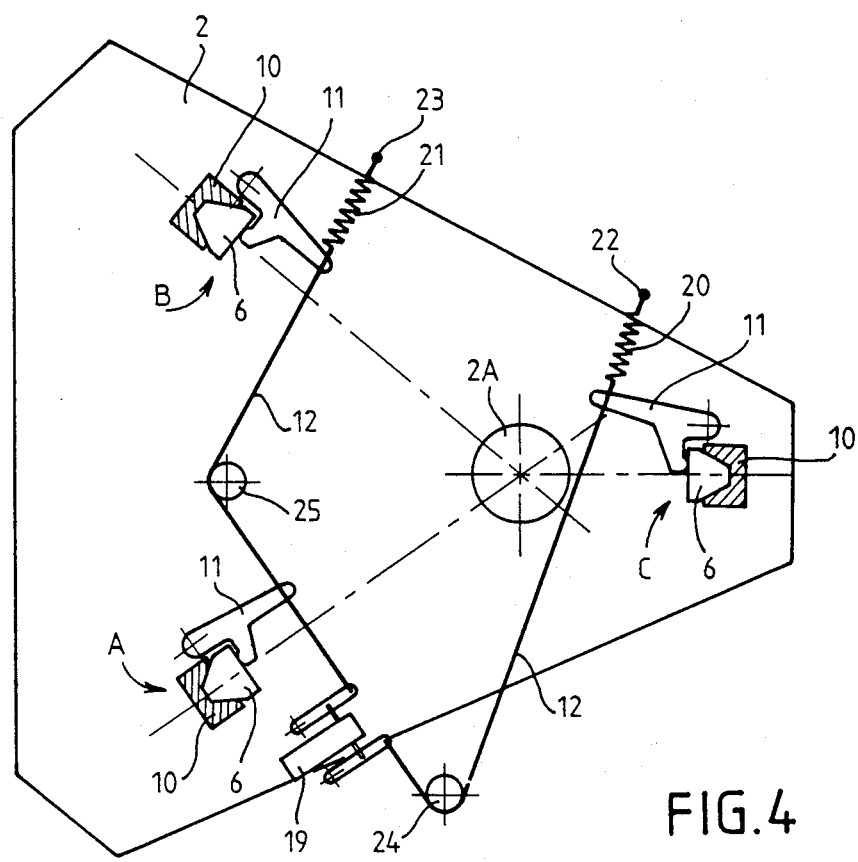
FIG. 4 is a schematic view on a smaller scale showing the possible distribution on the fixed element of three devices for holding the movable element, their respective release levers being held in their locking position through a common sheaving cable.
Figure 5:
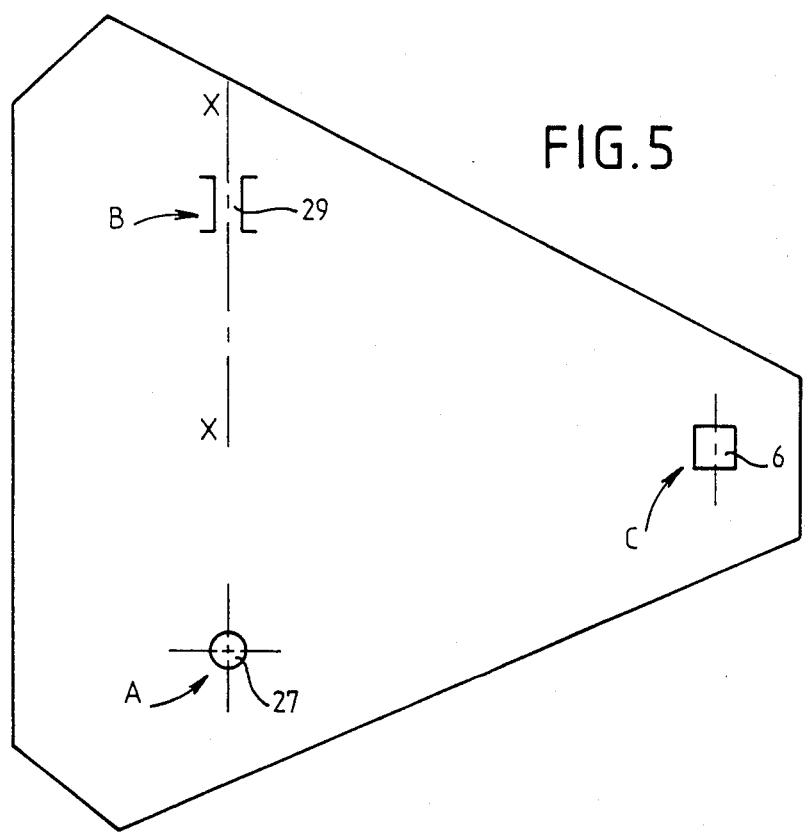
FIG. 5 is a schematic explanatory view to show how stress transmission can occur in the plane of the three holding points of FIG. 4, it being noted that one of the three holding points conforms to the schematic view of FIG. 6, the second to that of FIG. 7 and the third to that of FIG. 8.
Figure 6:
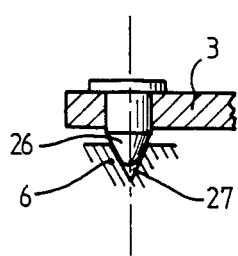
Figure 7:
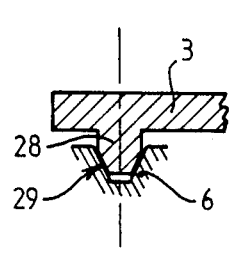
Figure 8:
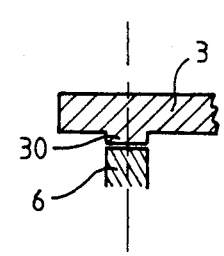

It will now be referred to the schematic view of FIG. 4 showing the possible triangular distribution on a fixed element 2 of three holding devices designated by the general references A, B and C, of the movable part (not shown), respectively.

For the sake of simplicity, each of the devices A, B and C is seen schematically by its movable support 6 in the high position, the V-shaped part in form of an abutment 10 of its foot and its release lever 11. On the sheaving cable 12 holding the three levers 11 in the locking position a pyrotechnic shear means 19 of any known type is mounted at a proper location, while two return springs 20 and 21 are secured between both free ends of the sheaving cable 12, and two fixed points 22 and 23, respectively. Finally, return pulleys 24 and 25 enable the cable 12 to be perfectly oriented to hold the release levers 11 in the locking position.

It appears immediately that the cutting of the sheaving cable 12 through the pyrotechnic shear means 19 causes simultaneous release of the three holding devices A, B and C.

Rotation of release lever 11 under the rotation of the return springs 20 and 21 and self-reversibility of each of the holding devices A, B and C, for the above described reasons, provoke for each of said devices A, B and C, complete retraction both of bracket 8 and the movable support 6 and therefore, release of the movable part 3 which then may oscillate about its average position in which it was then immobilized.

The major advantage of this invention is that immobilization of the movable part 3 is effected in a precise average position thereby eliminating any stress on the orientation mechanisms for said movable portion in the operative position of the satellite.

Thus, in the case in particular of the application of the invention to an antenna pointing system, the movable part carrying the antenna can be connected to the fixed part 2 of the satellite through a securement means, e.g. a mechanical means, consisting of a thin cylinder of an elastic material having a front face perforated with concentric orifices in alternate sectors, such cylinder being schematically shown at $2_A$ in FIG. 4. Such mechanical connection both permits to prevent occurrence of stresses upon the orientation mechanisms of the antenna in the launching phase and on the contrary, to cause them to operate in the release phase to ensure proper orientation of the movable part in the desired direction during the operative phase.

Generally, it is particularly interesting to apply the invention to the case of any instrument requiring e.g.:

the tipping over for accurate pointing in the operative condition, and the launching in a defined accurate position, or to the case of filming instruments, sensors, detectors.

This invention has other advantages, in particular, as regards transmission of stresses during the launching phase which raises a significant problem, which is to be solved.

It can be immediately seen from the above description that during such phase, the stresses exerted perpendicularly to the plane through the three holding devices are integrally absorbed by the brackets and the movable supports of said devices.

Figure 9:
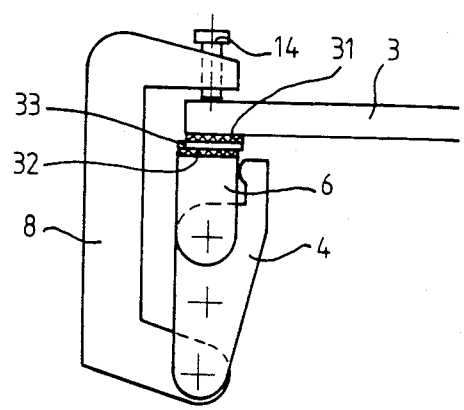
FIG. 9 is a schematic explanatory view of an alternative form of embodiment in which the stress transmission is ensured by friction.

As regards stresses occurring in the plane through the three holding devices, they can be transmitted in accordance with the invention either according to the concept schematized in FIGS. 5, 6, 7 and 8 or according to the one schematized in FIG. 9.

According to the concept of FIGS. 5 to 8, it is acted as follows:

one of the three holding points, e.g. device A, ensures said transmission by means of a conical organ 26 connected with movable part 3, and its lodging 27 formed in the corresponding movable support 6;

a second holding point, e.g. device B, ensures orientation of the movable part 3 by means of a tenon 28 secured to said movable part 3 and housed in a slide 29 formed in the corresponding movable support 6, the axis XX of which passes through the centerline of the conical organ 26;

the third holding point, in the occurrence, device C, consists of a simple rest of a tenon 30 connected to the movable element 3 upon the respective movable support 6.

This solution has the advantage of making the stresses pass in the horizontal plane (in the drawing) and ensuring accurate repositioning on each sheaving.

According to the concept of FIG. 9, transmission of the stresses in the horizontal plane results from friction.

To this end, on each holding point the movable part 3 and the movable support 6 comprise a rough surface consisting of points in form of a pyramid 31 for the former and 32 for the latter, the contact between such two rough surfaces being achieved by an intermediary metallic wedge 33 the malleability of which is determined as required.

The tightening force of the bracket depends on the frictional factor determined by trial.

The bracket 8 behaves as a spring, thereby permitting to ensure a minimum tightening force as necessary for transmitting stresses in the horizontal plane.

It is to be noted that this concept of stress transmission by friction does not permit to achieve as accurate a positioning as the above and that it also requires positioning tool means to achieve the sheaving of the movable part. On the other hand, the number of holding points can be increased very easily thereby.

Both of the above described concepts for transmission of stresses in the plane obviously have each a very specific and complementary domain of application which depends in particular on the requirement for accuracy.

Furthermore, it is important to note that the prestress force of the bracket as well as the shifting of its hinging axis cause the mechanism to automatically unlock thereby affording a very reliable device. Moreover, the return spring of the link complementarily enhances the safety of operation.

Figure 12:
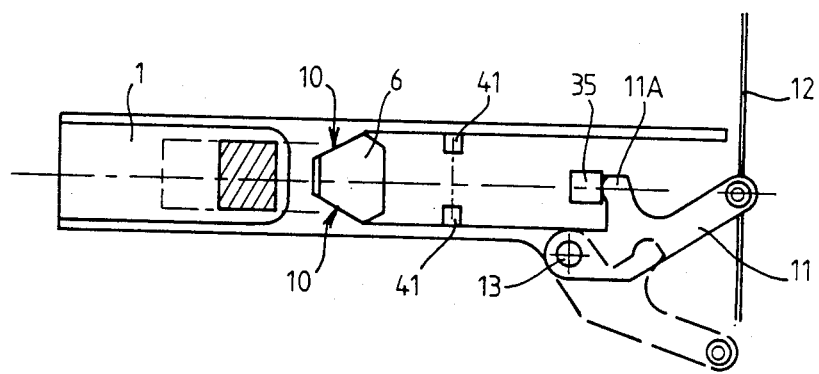
FIGS. 10, 11, and 12 are views similar to FIGS. 1, 2 and 3, showing alternative forms of embodiment of the device in which the loads induced into the sheaving cable are limited by a mechanical relay.
Figure 10:
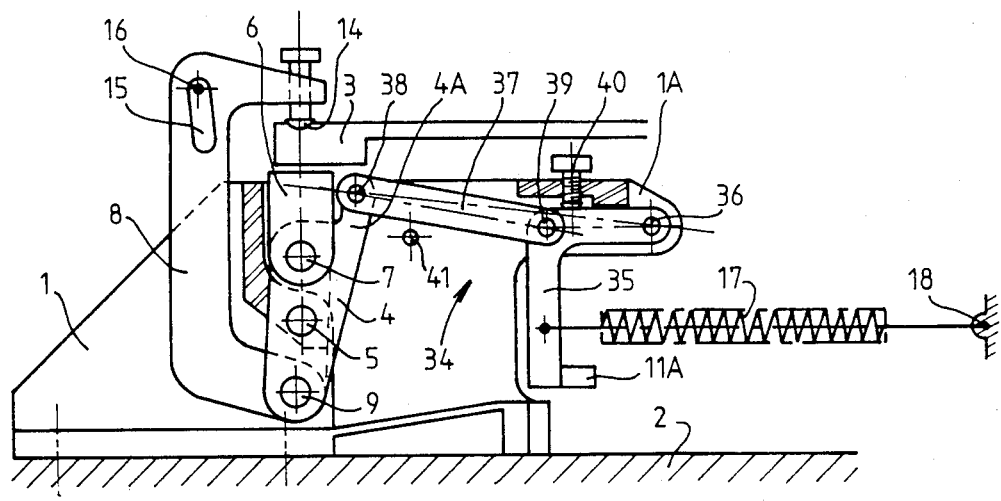
Figure 11:
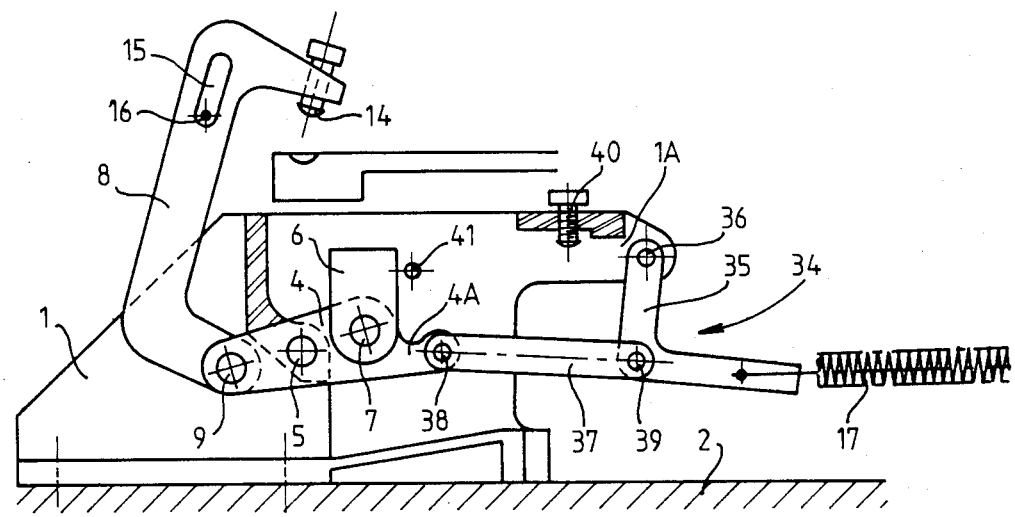

To limit loads induced into the sheaving cable, which in certain cases may limit the very possibilities of the holding and release devices actuated through a common sheaving cable, the alternative form of embodiment shown in an exemplifying way in FIGS. 10 to 12 can be adopted.

The holding and releasing device proper is strictly identical to that of FIGS. 1, 2 and 3, and it will therefore not be described again to avoid unnecessary overload in the description. FIGS. 10, 11 and 12 contain the same reference numerals as those used in FIGS. 1, 2 and 3, to designate the identical elements.

The essential characteristic of the alternative form of embodiment of FIGS. 10 to 12 is the arrangement of a mechanical relay designated by the general reference numeral 34 between the link 4 and the release lever 11, and the purpose of which is to ensure proper reduction for limiting loads induced into the sheaving cable 12.

The mechanical relay 34 shown in an exemplifying manner in FIGS. 10 to 12 essentially consists of a locking lever 35 in form of a L-shaped member hinged at its upper free end to an axis 36 integral with a shoulder portion $1_A$ of the foot 1, the lower free end of lever 35 supporting the shoulder portion $11_A$ of the release lever 11 in the sheaving position; a connecting bar 37 hinged at one end to an axis 38 connected to the end shoulder $4_A$ of the link 4, at its other end to an axis 39 located in the right angle portion of the locking lever 35; and an abutting screw 40 mounted on the shoulder portion $1_A$ of the foot 1, and which comes to bear (please refer to FIG. 10) on the substantially horizontal portion of the locking lever 35 which is included between the hinging axes 36 and 39, such abutting screw 40 providing for adjustment of the reversibility of the system through modification of the distance of the geometric centerline of the hinging axis 39 to the virtual line connecting the geometric centerlines of the extreme hinging axes 36 and 38.

It is to be noted that the return spring 17, secured between a point 18 of the fixed portion 2 and a point on the free end of the link 4 in the form of embodiment of FIGS. 1 and 2, is secured here between a point 18 of the fixed portion 2 and a point on the lower free end of the locking lever 35.

With reference to FIGS. 10, 11 and 12, it can be noted immediately that the amplitude of the loads induced into the sheaving cable 12 can be adjusted by the abutting screw 40 and the ratios of the various lever arms, to the suitable amplitude as required for the perfect operation of the system.

An abutment 41 can advantageously be provided for immobilization of the movable support 6 in a position perfectly defined in the displayed configuration of FIG. 11.

It will be understood that this invention was only described and represented in a purely explanatory and not at all limitative manner and that technical equivalent parts can be substituted for its constituent elements without departing from the scope of the invention which is defined in the appended claims.

We claim:

1. A holding and releasing system permitting to provide a temporary connection between a movable part and a stationary part which must be separated from one another during their specific use, more particularly, within the limits of an application to a space vehicle, comprising: several elementary devices, each being constituted by a supporting foot connected to the stationary part; a link in form of a rocker hinged to the foot at its central portion; an element in form of a movable support hinged to one end of the link; a sheaving bracket hinged to the other end of the link; said link being capable of taking one of two positions, i.e. a locking position in which the movable support comes to bear on a face of the movable part, while the other end of the sheaving bracket comes to bear on the opposed face of the movable part, opposite the movable support, thereby causing immobilization of the movable part in a very precise position, and a release position in which the movable support as well as the sheaving bracket are both in a retracted position thereby releasing the movable part of any holding stress and permitting it to oscillate; a release lever hinged to the foot and intended to block the link to the locking position; a control device to free the release lever from its blocking function; and means for automatically causing the link to pivot from the locking position to the release position.

2. A system according to claim 1, wherein said means for causing automatic pivoting of the link from its locking position to its release position consist of a tensioning screw mounted on the free end of the sheaving bracket and bearing on the movable part by ensuring a prestress combined with a shift of the hinging axis of the bracket to the link with respect to the hinging axis of the link to the foot, such means ensuring self-reversibility of the system and being advantageously completed by an elastic system urging the link to its release position.

3. A system according to claim 1, wherein the control device for freeing the release lever from its blocking function consists of a return spring cable with a pyrotechnic control shear means.

4. A system according to claim 1, wherein the system comprises at least three elementary devices distributed at the apex of a triangle the movable supports of which determine a support plane for the movable part, the release levers of the elementary devices being held in the blocking position through a common sheaving cable having free ends submitted to return springs and comprising a pyrotechnic control shear means.

5. A system according to claim 4, wherein the loads induced into the sheaving cable controlling the release levers are limited by disposing between the link and the release lever in each elementary device a mechanical relay intended for providing a reduction ratio.

6. A system according to claim 5, wherein the mechanical relay consists of a locking lever in form of an L-shaped member hinged to the foot and connected to the link through a connecting bar, the release lever bearing against the free end of the locking lever and an abutting screw permitting to provide adjustment of reversibility of the system.

7. A system according to claim 4, wherein there are provided three holding devices for transmission of stresses in the holding plane due to the fact that one of the three points comprises a conical organ in the movable part, said conical organ having a lodging formed on the movable support, the second of said three points comprising a tenon on the movable part, housed in a slide formed in the corresponding movable support, and the longitudinal axis of which passes through the centerline of the conical organ, and the third point comprising a simple rest of the movable portion upon the corresponding movable support.

8. A system according to claim 4, wherein there are provided a number of supporting points higher than three, the transmission of stresses in the holding plane being ensured by friction, the movable part and the corresponding movable support comprising to this end a rough surface and contact theref being ensured by an intermediary metallic wedge the malleability of which is determined as required.

* * * * *